United States Patent [19]

Mark, et al.

[11] Patent Number: 4,634,283

[45] Date of Patent: Jan. 6, 1987

[54] METHOD AND APPARATUS FOR REDUCING QUANTIZATION ERROR IN LASER GYRO TEST DATA THROUGH HIGH SPEED FILTERING

[75] Inventor: John G. Mark, Pasadena, Calif.;
Alison K. Brown, Monument, Colo.;
Anthony Matthews, Calabasas,, Calif.

[73] Assignee: Litton Systems, Inc., Beverly Hills, Calif.

[21] Appl. No.: 590,111

[22] Filed: Mar. 19, 1984

[51] Int. Cl.⁴ .............................................. G01C 19/64
[52] U.S. Cl. .................................................. 356/350
[58] Field of Search ........................... 356/350; 372/94

[56] References Cited

U.S. PATENT DOCUMENTS 4,422,762 12/1983 Hutchings et al. ................. 356/350

*Primary Examiner*—Davis L. Willis
*Assistant Examiner*—S. A. Turner
*Attorney, Agent, or Firm*—Harold E. Gillmann

[57] ABSTRACT

The use of a high speed moving average filter is shown to filter high speed errors, including white noise in angle and quantization errors, from the output data of a ring laser gyro while it is being tested. The filtered data permits investigation of the lower speed, random walk in angle error of the gyro being tested. For best results, several moving average filters are connected in series.

12 Claims, 4 Drawing Figures

METHOD AND APPARATUS FOR REDUCING QUANTIZATION ERROR IN LASER GYRO TEST DATA THROUGH HIGH SPEED FILTERING

FIELD OF THE INVENTION

The present invention relates to a method and apparatus for reducing quantization error in a ring laser gyro and, more particularly, to a method and apparatus which filters the test data from a ring laser gyro to remove or substantially limit white noise in angle and quantization errors and to speed the estimation of random walk in angle errors to permit the investigation of random walk errors within a relatively short time period.

BACKGROUND OF THE INVENTION

Present methods of accumulating data from a ring laser gyro are relatively simple and straight forward. However, these methods are inefficient in predicting fundamental gyro parameters and system performance. The parameters referred to include the angle output of the gyro in degrees per hour and various error information such as random walk in angle, white noise in angle and quantization error. Random walk in angle is an error signal which represents the inherent drift of an individual gyro. This drift can be either in a positive or negative direction. For example, if a ring laser gyro were strapped down and pointed north, the data recorded over a period of time might vary toward the east or west, rather than continually indicating a north pointing direction. This error tends to increase with the passage of time and is thus time dependent. White noise in angle is that variation from either side of north caused by various inaccuracies within the system. The variations to one or the other side of true north tend to be equalized over a period of time and are thus not time dependent. Quantization errors occur when the gyro is dithered or purposefully oscillated. This error is caused when counting oscillations per unit of time. In a given unit of time, there will most likely be a portion of an oscillation which has not been completed. Thus, the count for each time unit may be high or low depending on where the oscillation was in its cycle when the unit of time closed. This error tends to cancel itself over an extended period of time and thus not time dependent.

In the prior art, the gyro data is gathered over an extended period of time for evaluation. This makes it difficult to evaluate the random walk in angle of the gyro when it is being tested on the test stand.

SUMMARY OF THE INVENTION

Accordingly, it is an object of the present invention to reduce the period of time required to evaluate the data from a ring laser gyro during testing, especially random walk in angle data.

This reduction is in time accomplished by a prefilter the gyro data which reduces the power of the white noise in angle and quantization error. A high speed filter is used to reduce the white noise in angle and quantization errors which tend to be high frequency errors. The filtering has less of an effect upon the lower speed random walk in angle error, thus making that error easier to observe and investigate over a short time period.

The pre-filter is capable of storing the input data received thereby and compares earlier received data with currently presented data. In the preferred embodiment, the high speed filter is a digital moving average filter. The concept of using a high speed moving filter is further augmented by a series of cascaded moving average filters which rapidly filter the high speed angle data to substantially reduce the white noise in angle and quantization errors; thus making evaluation of the lower frequency random walk in angle possible.

DESCRIPTION OF THE DRAWINGS

A better understanding of the objects and advantages of the present invention will be had after reference to the following specification and drawings wherein.

DESCRIPTION OF THE PREFERRED EMBODIMENT

Figure 1:
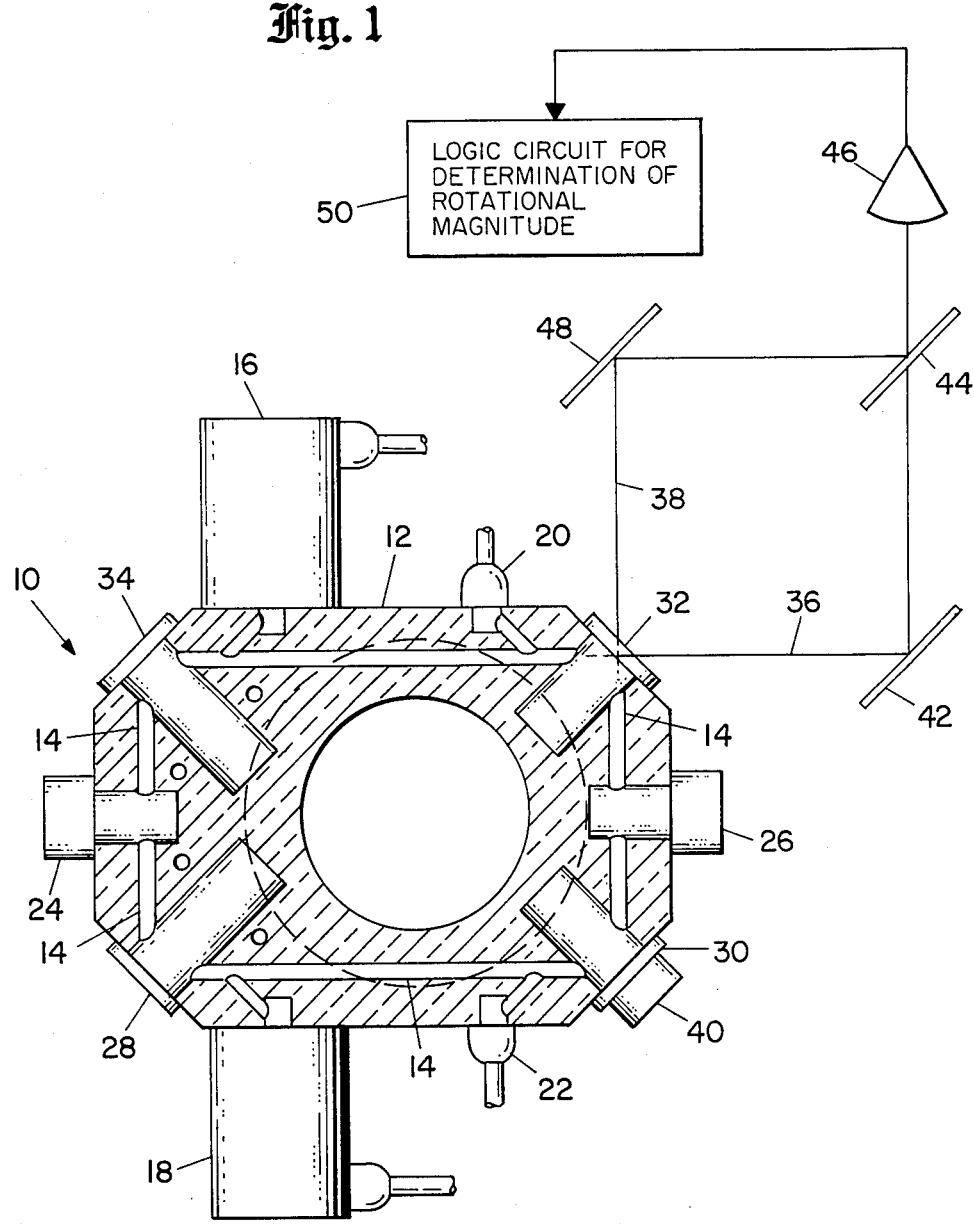
FIG. 1 is a cross-sectional view of a typical ring laser gyro assembly and associated circuitry.

Referring to the drawings, FIG. 1 shows a typical gas laser 10, such as a helium neon laser. The gas laser 10 is typical of a laser that may be utilized in a ring laser gyroscope. The laser is formed within a body 12, such as quartz, a material known as "U.L.E." titanium silcate manufactured by Corning, or a material known as "cervit" manufactured by Owens Illinois. The laser body 12 is constructed with four passageways 14 arranged therein to form a rectangular laser path. A triangular construction may also be used within the present invention. The passageways 14 are sealed to retain a gas mixture consisting of approximately 90% helium and 10% neon at a vacuum of approximately 3 torr, it being understood that atmopsheric pressure is approximately 760 torr.

In accordance with known laser practice, the body 12 is provided with two cathodes, 16 and 18, and two anodes, 20 and 22, that are secured to the body in a manner which is also well-known in the art. A gas discharge is established between cathode 16 and anode 20 in passageway 14 as well as between cathode 18 and anode 22 in the opposite passageway. Getters 24 and 26 are provided at opposite ends of the body passageways 14. Mirror 28, 30, 32 and 34 are located at the four corners of the optical path formed within the passageways 14 of the ring laser gyro 10. Mirrors 28 and 34 are used solely for reflecting the laser beams 36 and 38 propogated in a clockwise and counterclockwise direction, respectively, through passageways 14. Mirror 30 may be attached to a piezoelectric element 40 which moves the mirror in and out as part of the path length control system. Mirror 32 is partially reflective for allowing a small portion of the laser beams 36 and 38 incident on its surface to pass through the mirror and be combined and processed to provide rotational information. Beams 36 and 38 thus represent counter propagating laser beams each containing two modes of right and left circularly polarized light for creating a total of four beams.

Beam 36 passes through the partially reflective mirror 32 to strike an external mirror 42 where it is reflected through a beam splitter 44 onto a signal photodiode 46. Beam 38 also passes through mirror 32 to strike a second external mirror 48 where it is reflected to the beam splitter 44 and reflected again to become approximately colinear with the beam 36. These beams strike the photodiode 42 simultaneously to generate several beat frequencies due to the difference in frequency between the four individual beams. The beat frequencies between all of the four modes oscillating in the cavity are defected in the photodiode 46 as described in U.S. Pat. No. 4,123,162, which issued on Oct. 31, 1978, entitled MULTIOSCILLATOR RING LASER GYRO OUTPUT INFORMATION PROCESSING METHOD by V. E. Sanders, assigned to the same assignee as the present invention. The information generated from the beat frequencies between the four oscillating modes or multioscillating beat note frequency is used to determine the magnitude of the rotation of the ring laser gyro within the logic circuit for determination of rotational magnitude 50.

Figure 2:
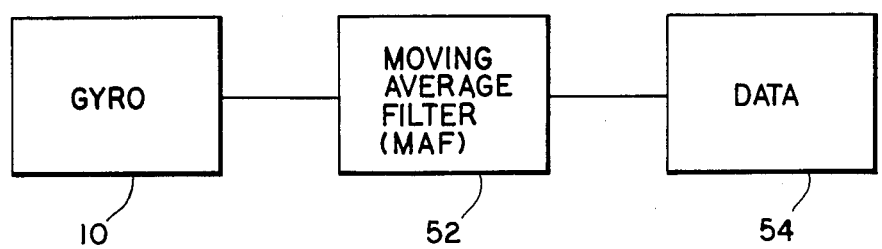
FIG. 2 is a block diagram showing the elements of the present invention in their simplest form.

As mentioned above, the output from logic circuit 50 will include the angle position data of the ring laser gyro as well as various error components including random walk in angle, white noise in angle, and quantization error. As seen in FIG. 2, the output from the logic circuit 50 is applied to a moving average filter (MAF) 52 and then to a data output terminal such as a digital printer 54. The moving average filter 52 is, in the preferred embodiment, a digital high speed filter having a memory or information storage capability for storing earlier received data for comparison with currently received data.

Figure 3:
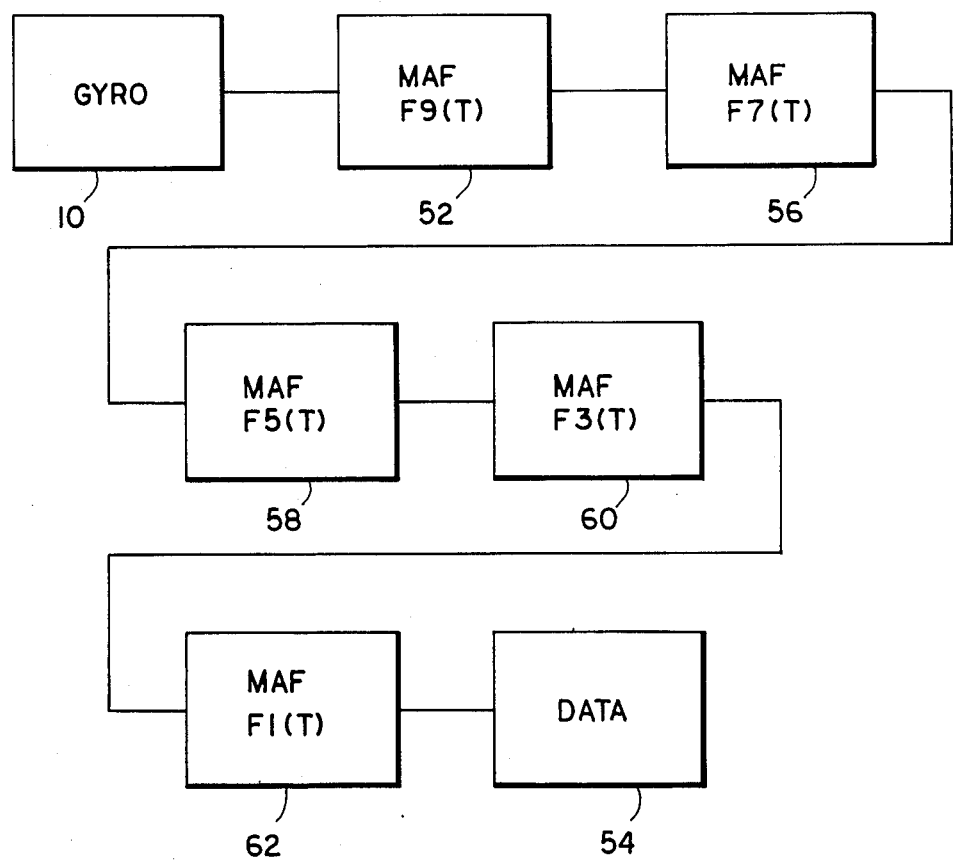
FIG. 3 is a block diagram similar to FIG. 2 showing a series of cascaded moving average filters.

As seen in FIG. 3, the moving average filter may be connected in series with additional filters wherein the first filter 52 stores the output of the gyro 10 from logic circuit 50 and compares that stored data with the input received at a time unit later than the first time unit T by $2^9$ units. The earlier received information is then subtracted from the currently received information to create a filter output identified as F9(T). This information is then passed to a seond moving average filter 56 where it is stored for $2^7$ time units. After $2^7$ time units have expired, the old information is subtracted from the newly received information and passed as F7(T) to the next moving average filter 58 where it is stored for $2^5$ units of time before a comparison is made by subtracting the stored information from the newly received information. This signal identified as F5(T) is then passed on to a fourth moving average filter 60 where the process is repeated every $2^3$ time units and the information F3(T) passed to a fifth moving average filter 62 where the process is again repeated to the first unit of time ($2^1$). The output F1(T) from moving average filter 62 is then presented to the data terminal 54 for review by the user of the apparatus.

Figure 4:
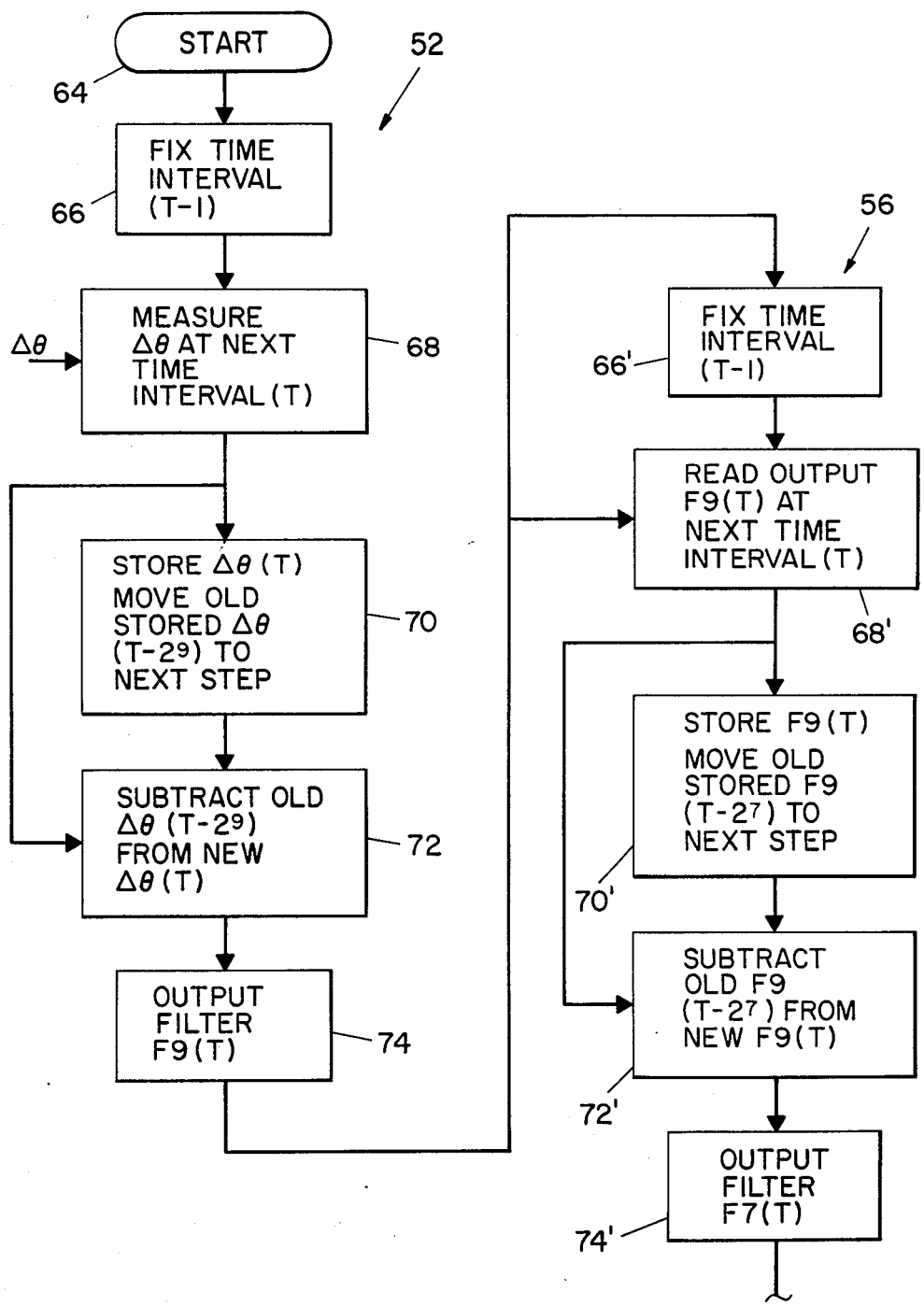
FIG. 4 is a block diagram showing the functions of the first and second filters of FIG. 3.

Referring now to FIG. 4, the electrical circuit components which produce the moving average filters 52 and 56 of FIG. 3 are shown. The apparatus is started by means 64 which initiates the timing sequences of the moving average filter 52 by fixing a time interval (T−1) in circuit 66. After the time interval is started, the output of laser 10 $\Delta\theta$ is applied to a device 66 which measures the $\Delta\theta$ at the time interval T. $\Delta\theta$ is then stored in storage unit 70 and applied to a subtraction unit 72. As $\Delta\theta$ is moved into the storage unit 70, the old value of $\Delta\theta$ stored at an earlier time, in this case $2^9$ or 512 time units earlier, identified as $\Delta\theta(T-2^9)$, is applied to the subtraction unit 72 where that value is subtracted from the new value of $\Delta\theta(T)$. The resultant output of the filter F9(T) is applied as an output signal from unit 74 to the input of the next moving average filter 56. The input to filter 56 causes the initiation of a fixed time interval in circuit 66' before the actual measurement is made in circuit 68'. The output F9(T) is then applied to storage unit 70' and to subtraction unit 72'. In unit 72' the newly presented output of filter 52 is subtracted from an earlier presented value which was presented $2^7$ or 128 time units earlier represented by the symbol F9(T−$2^7$). The resultant signal F7(T) is then applied to the moving average filter 58 whose output F5(T) is presented to a similar filter 60 whose output F3(T) is applied to filter 62 whose output F1(T) is then applied to the data terminal 54.

It will now be understood that the moving average filter is continually updated by comparing information which was received in an earlier time period with later received information. The data acquisition and filtering technique which operates at a high rate, 1024 cycles per second, is extremely simple. The raw gyro pulses are passed through a series of moving average filters before being accumulated into samples of one second. This system has a number of advantages. First, the only process used is addition and subtraction which minimizes the circuitry necessary to implement the filtering scheme. Second, the filters have finite impulse responses; that is, they achieve a final value in less than one second. Third, the filters are "bit conservative" which simply means that all processes are exact without rounding out. Through the high speed filtering, the white noise in angle and quantization errors may be substantially filtered from the data. The lower speed random walk in angle may now be observed to investigate these short term gyro transient effects.

It should be understood that the apparatus and method described herein works only on ring laser gyros which are being tested.

Equations expressing the functions of the serially connected moving average filters 52, 56, 58, 60 and 62 may be written as follows:

$$F9(T-1)+\Delta\theta(T)-\Delta\theta(T-2^9)=F9(T)$$

$$F7(T-1)+F9(T)-F9(T-2^7)=F7(T)$$

$$F5(T-1)+F7(T)-F7(T-2^5)=F5(T)$$

$$F3(T-1)+F5(T)-F5(T-2^3)=F3(T)$$

$$F1(T-1)+F3(T)-F3(T-2^1)=F1(T)$$

Note that the output of filter 52, F9(T), is formed by selecting a time frame, F9(T−1), one unit of time prior to the time that the actual angle $\Delta\theta(T)$ is measured. The earlier measurement of $\Delta\theta$, $2^9$ or 512 time units before, $\Delta\theta(T-2^9)$, is then subtracted from the newly received value $\Delta\theta(T)$ to obtain the output of the filter F9(T). Similarly, the filter 56 subtracts the earlier stored value of F9(T) received $2^7$ or 128 time units earlier; while filter 58 subtracts the earlier stored value of F7(T) received $2^5$ or 32 time units earlier. This is repeated in filter 60 which subtracts the stored value F5(T) received $2^3$ or 8 time units earlier, F5(T−$2^3$), from the newly received signal F5(T) to produce the output F3(T) from which is subtracted the earlier stored value F3(T), stored but 2 time units earlier in filter 62. The final output of the filter 62, F1(T), equals the output of all filters or the filtered value of $\Delta\theta$ filter.

The output of filter 62 is accumulated or summed as follows:

$$2^{-25} \sum_{T=0}^{1023} F1(T) = \Delta\theta_{filter}$$

It will be noted that the output of filter 62, F1(T), is divided by a scale factor $2^{-25}$.

While the foregoing invention has been described using factors of 2 to the 9th and descending powers, it will be understood that other arrangements may also be used. Further, it will be understood that the invention should not be limited by the particular number of moving average filters or by any particular design of the moving average filter. As long as a filter is utilized which stores an earlier value of $\Delta\theta$, the present invention will function to advantage.

I claim:

1. A method for processing ring laser gyroscope test data comprising the steps of:
   (a) accumulating said data over a preselected sample period; and
   (b) filtering said data at a predetermined frequency so that non-time dependent errors are reduced by a substantially greater amount than are time dependent errors; then
   (c) analyzing the random walk error of said filtered data.

2. A method as defined in claim 1 wherein the filtering step is accomplished by at least one high speed moving average filter.

3. A method as defined in claim 2 wherein said predetermined frequency is 1,024 Hz and said preselected sample period does not exceed 1 second.

4. A method as defined in claim 3 wherein the filtering step is accomplished by five cascaded moving average filters.

5. A method for compensating a ring laser gyroscope comprising the steps of:
   (a) accumulating gyro test data over a preselected sample period; and
   (b) filtering said data at a predetermined frequency so that non-time dependent errors are reduced by a substantially greater amount than are time dependent errors; then
   (c) analyzing the random walk error of said filtered data; then
   (d) calibrating said gyroscope in accordance with said random walk error.

6. A method as defined in claim 5 wherein the filtering step is accomplished by at least one high speed moving average filter.

7. A method as defined in claim 6 wherein said predetermined frequency is 1,024 Hz and said preselected sample period does not exceed 1 second.

8. A method as defined in claim 7 wherein the filtering step is accomplished by five cascaded moving average filters.

9. Apparatus for processing raw test data from a ring laser gyroscope comprising, in combination:
   (a) means for accumulating test data over a preselected sample period;
   (b) means for filtering said data at a predetermined rate so that non-time dependent errors are reduced by a substantially greater amount than time dependent errors; and
   (c) means for analyzing the random walk error of said filtered data.

10. Apparatus as defined in claim 9 wherein said means for filtering includes at least one high speed moving average filter.

11. Apparatus as defined in claim 10 wherein said predetermined frequency rate is 1,024 Hz and said sample period does not exceed 1 second.

12. Apparatus as defined in claim 11 including five cascaded moving average filters.

* * * * *